United States Patent [19]

Tusting

[11] Patent Number: 4,856,874

[45] Date of Patent: Aug. 15, 1989

[54] SAFETY DEVICES FOR SUBMARINE LASERS

[75] Inventor: Robert F. Tusting, Ft. Pierce, Fla.

[73] Assignee: Harbor Oceanographic Institution, Inc., Ft. Pierce, Fla.

[21] Appl. No.: 185,548

[22] Filed: Apr. 25, 1988

Related U.S. Application Data

[63] Continuation-in-part of Ser. No. 40,991, Apr. 20, 1987.

[51] Int. Cl.[4] ............................................. G02B 26/02

[52] U.S. Cl. .................................... 350/267; 372/103; 372/108; 372/109

[58] Field of Search ......................... 372/109; 350/267

Primary Examiner—Leon Scott, Jr.
Attorney, Agent, or Firm—Carroll F. Palmer

[57] ABSTRACT

A laser device for use in submarine service having a window portion through which it emits coherent light has a safety feature that permits coherent light to be emitted through the window portion only when the laser device is immersed in water. In one embodiment, the safety feature involves a pressure switch and in a second embodiment, it involves a shutter float.

10 Claims, 1 Drawing Sheet

SAFETY DEVICES FOR SUBMARINE LASERS

CROSS-REFERENCE TO RELATED APPLICATION

This application is a continuation-in-part of copending application Ser. No. 040,991, filed Apr. 20, 1987.

BACKGROUND OF THE INVENTION

1. Field of the Invention

This invention relates broadly to laser devices designed to operate in a submarine environment. More particularly, it concerns safety features for such devices that prevent them from emitting coherent light unless they are immersed in water.

2. Description of the Prior Art

Laser devices can be effectively used in submarine environments for a variety of applications. One such application is disclosed in copending application Ser. No. 040,991, the disclosure of which is incorporated herein by reference, wherein laser units are used in obtaining underwater visual recordings with photographic or video cameras to assist in insuring that the subject being recorded will be at the correct distance and within the field of view at the time of exposure. Also, the laser units assist in (1) attaining more efficient use of battery or other power, (2) saving of film, (3) avoid triggering of exposure by spurious materials or events and (4) obtaining consistently well focused recordings.

Because of the magnitude of the energy flux in the coherent light emitted by the submarine laser devices used in such applications, there exists the constant danger of injury to the eyes or other body parts of persons working with such devices, particularly during periods of time when the devices are being lowered into or lifted out of the water. The present invention provides the laser devices with safety features that prevent the occurrence of such injuries or other damage in the use of the submarine laser devices.

OBJECTS

A principal object of the invention is the provision of improved submarine laser devices.

Further objects include the provision of:

1. Safety features for submarine laser devices that automatically prevent them from emitting coherent light unless they are immersed in water below a certain depth.

2. Such safety features that do not require electric power to function.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished, in part, in accordance with the invention by the provision of laser devices for use in submarine service that comprise a window portion through which the unit emits coherent light and means to permit coherent light to be emitted through the window portion only when the laser device is immersed in water. Typically, such devices will include a waterproof housing enclosing the laser unit plus an electric conduit means for supplying power from an outside source to the laser unit or an internal battery as the power supply.

In a preferred embodiment, shutter means prevents coherent light from being emitted through the window portion unless the laser device is immersed in water. Such shutter means may comprise a body member having a rear wall, a front wall and a side wall with a first bore extending through the body member from the rear wall to the front wall and a chamber within the body member that intersects the first bore. A plurality of second bores extend through the side wall and the body member into the chamber to ensure flushing. A ball having a relative density less than 1 and a diameter greater than the lumen of the first bore is captured in the chamber for free movement therein. Finally, means is included to mount the body member with its rear wall covering the window portion of the the laser device in a manner as to permit coherent light that exits the window portion to pass only into the first bore.

With such a shutter arrangement, when the laser device is out of the water, the ball falls down in the chamber to block the lumen of the first bore and prevent light emitted from the laser to pass through such bore. However, when the laser device is immersed in water to a depth where the ball will float, it rises in the chamber, opening the lumen in the first bore to provide a clear channel for coherent light from the laser to pass into the ambient water.

In preferred forms of such shutter units, the side wall is circular in shape, the chamber is cylindrical in shape and has a diameter slightly larger than the diameter of the ball. Additionally, the body member has a threaded opening in the top of its side wall that communicates with the chamber and such opening is closed by a vented plug that is threaded therein so the ball is retained in the chamber, but may be removed by unscrewing the closure plug.

Advantageously, the means to mount the shutter unit on the laser device is a flange on the rear wall portion of the body member. Further, the shutter unit has a third bore that extends through its side wall and intersects the first bore between the chamber and the rear wall. This is used to override the float/shutter for testing.

In another embodiment of the safety features of the invention, a normally open pressure switch permits flow of the power to the laser unit only when the device is immersed to at least a predetermined depth in water and thereby prevents coherent light from being emitted by the laser unit until immersed to a least a predetermined depth in water. If desired, the shutter embodiment and the switch embodiment may be used in combination to increase safety potential of the laser devices.

BRIEF DESCRIPTION OF THE DRAWINGS

A more complete understanding of the invention may be had by reference to the accompanying drawings in which.

DESCRIPTION OF THE PREFERRED EMBODIMENTS

Figure 5:
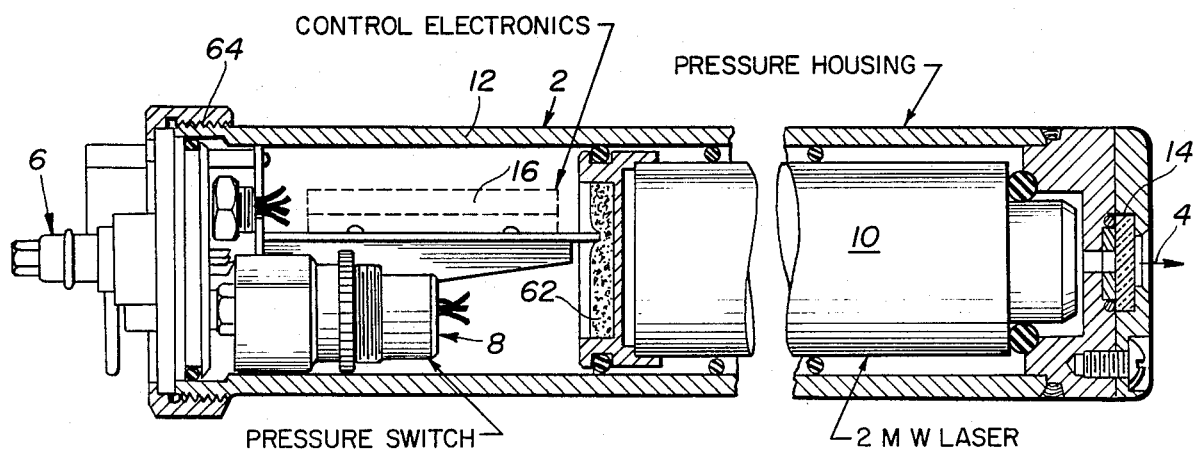
FIG. 5 is a sectional view of a second embodiment of a submarine laser device of the invention.

Referring in detail to the drawings and first to FIG. 5, the invention comprises a submarine laser device 2 useable for a variety of submarine applications, e.g., to assist in making consistently in-focus visual records of benthic or other submarine objects with a camera (not shown). Also, for recording size information on photographic records, both still and video.

The laser device 2 is structured to emit a beam 4 of coherent light. A power source (not shown) is connected by electrical conductor means 6 and pressure switch 8 to the laser unit 10, enclosed in the pressure housing 12, to energize it to emit the coherent light beam 4 through the window portion 14 of the laser device 2. The housing 12 also contains electrical control means 16 in the form of printed circuit board and a foam cushion 62. The removable end cap 64 serves as a mounting base for the control means 16, the pressure switch 8 and the conductor means 6. Standard O-rings are used for sealing of the laser devices 2.

The laser unit 10 typically will be 20" long by 2" diameter and will have a starting voltage of 10KV, input power of 23-33V d.c. at 0.6 A, an output power of 2 mW minimum producing, in red beam embodiment, a laser beam of wavelength 632.8 nm. having a bandwidth less than 0.1 nm. with a beam diameter of 0.7 mm and a divergence of 1.2 m radian (full angle), e.g. the beam is 0.05" at window 14, 0.10" at 5 ft, 0.15" at 10 ft and 0.20" at 15 ft with an effective range up to 20 ft depending on water clarity and observation system sensitivity. In a green beam embodiment, the laser beam typically will have wavelength 543.5 nm. having a bandwidth less than 0.1 nm. with a beam diameter of 0.5 mm and a divergence of 1.6 m radian (full angle).

The coherent light beam 4 is visible in daylight or in the presence of floodlights.

The housing 12 is typically 25" long by 3" diameter, weight in air 5.5 lbs (in water 0.5 lbs) made of 6061-T6 aluminum with plastic hardware and is capable of operating at depths up to 3,000 ft. or even deeper with increase housing wall thickness. Pressure switch 8 will typically be structured to enable input power at a depth of 20 ft. or greater.

The laser unit 10 is on during operation of the device 2, providing input power is available and the safety feature 8 is enabled. Hence, emission of the coherent light beam 4 is prevented from the device until it is immersed in water.

A preferred embodiment of a laser device 2' of the invention is shown in FIGS. 1–4.

The device 2' includes shutter means 20 held on the pressure housing 12 by its rear flange 22 and the compression ring 24.

Shutter means 20 comprises a body member 24 having a rear wall 26, a front wall 28 and a side wall 30, a first bore 32 extending through the body member 24 from the rear wall 26 to the front wall 28.

A chamber 34 within the body member 24 intersects the first bore 32, and a plurality of second bores 36 extend through the side wall 30 and the body member 24 into the chamber 34.

A ball 38 having a relative density less than 1 and a diameter greater than the lumen of the first bore 32 is captured in the chamber 34 for free movement therein.

As indicated previously, the body member 24 is mounted with the rear wall covering the window portion of the laser device 2' in a manner to permit light that exits the window to pass into the first bore 32.

The body member 24 has a threaded opening 40 in the side wall 30 that communicates with the chamber 34 and such opening 40 is closed by a plug 42, having a vent hole 43, that is threaded therein.

A third bore 44, provided to flush the laser window, extends through the side wall 30 and intersects the first bore 32 between the chamber 34 and the rear wall 26. The bores 36 & 44 allow water to freely flow into the chamber 34 when the laser device 2' is immersed in water. Also, bore 36 allows a small pin to be inserted to temporarily fix the ball 38 in its "open" position for in-air testing of the device 2'.

Figure 2:
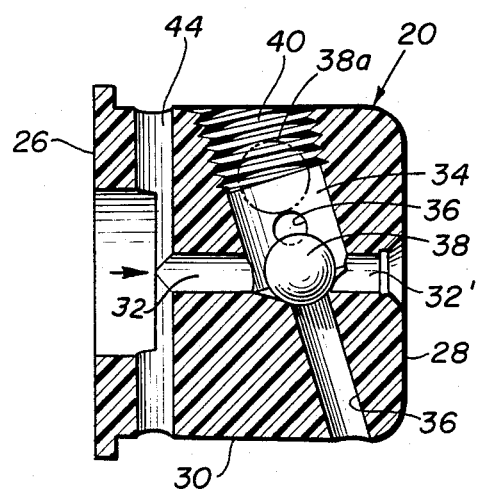
FIG. 2 is lateral section view of the shutter unit of the laser device shown in FIG. 1.
Figure 4:
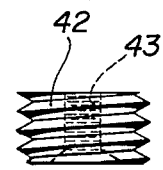
FIG. 4 is a lateral view of a vented closure plug for the shutter unit.

When the device 2' is out of water the ball 38 will rest on bottom of chamber 34 as shown by the lower ball 38 in FIG. 2 and prevent coherent light from being emitted from the exit end 32' of the bore 32. Thus, such light will be scattered and emanate from the body member 24 diffusely and harmlessly. When the ball 38 blocks the first bore 32 and the laser is ON, the whole body 24, being made of white translucent plastic, will glow, indicating the laser is on, but the shutter is closed.

When the device 2' is immersed in water, the ball 38 will float to the top of chamber 34 as shown by the upper ball 38a in FIG. 22 and allow the passage of coherent light through the bore 32.

In a typical shutter unit 20 of the invention, the body member is cylindrical in shape with a diameter of about 1 inch. and 1 inch in length between rear wall 26 & 28. The bores 32, 36 & 44 are 0.125" in diameter, the chamber 34 is 23/64" in diameter and the ball 0.25" in diameter. The plug 42 is 7/16" in diameter and ⅜" in height. The body member 24 is made of white, translucent "Deldrin" plastic and the ball 38 is made of polypropylene.

Figure 1:
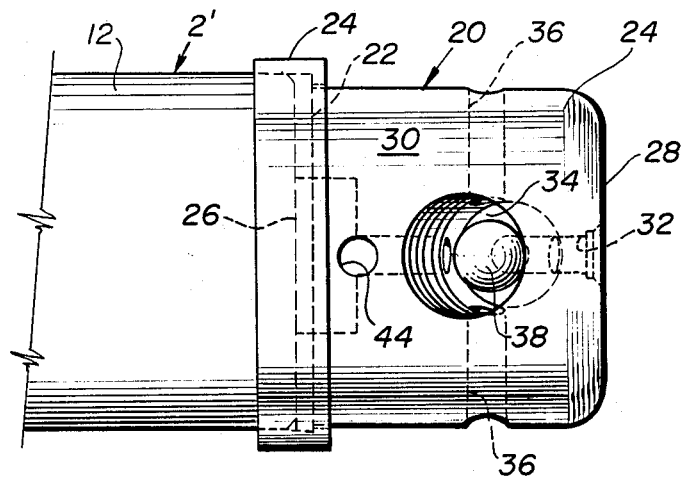
FIG. 1 is a fragmentary plan view of a first embodiment of a submarine laser device constructed in accordance with the invention.
Figure 3:
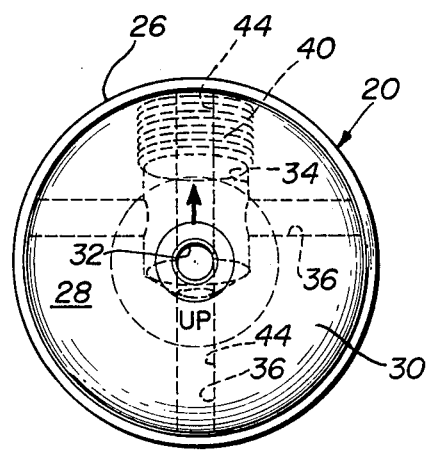
FIG. 3 is a front end view of the shutter unit shown in FIG. 2.

The indica UP and the arrow shown in FIG. 3 are engraved on the front wall 28 to ensure that the shutter unit will properly positioned on the pressure housing 12 of the laser device 2'.

The embodiments of the invention in which an exclusive property or privilege is claimed are defined as follows:

1. A laser device for use in submarine service comprising:
    a laser unit capable of emitting a coherent light beam,
    a waterproof housing enclosing said laser unit,
    a window portion in said housing through which said coherent light beam exists said laser device, and
    means to permit said coherent light beam to issue from said laser device through said window portion only when said laser device is immersed in water.

2. The laser device of claim 1 further including electric conduit means for supplying power from an outside source to said laser unit.

3. A laser device for use in submarine service comprising:
    a laser unit for emitting a coherent light beam,
    a waterproof housing enclosing said laser unit,
    a window portion in said housing through which said coherent light beam exits said laser device, and shutter means for blocking passage of said coherent light beam beyond said window portion unless said laser device is immersed in water.

4. The laser device of claim 3 wherein said shutter means comprises:
 a body member having a rear wall, a front wall and a side wall,
 a first bore extending through said body member from said rear wall to said front wall,
 a chamber within said body member that intersects said first bore,
 a plurality of second bores extending through said side wall and said body member into said chamber,
 a ball having a relative density less than 1 and a diameter greater than the diameter of said first bore in said chamber so as to provide free movement therein, and
 means to mount said body member onto said window portion such that said coherent light beam passes from said window portion into and through said first bore when said laser device is immersed in water, said beam being blocked by said ball from passing though said first bore when said laser device is not immersed in water.

5. The laser device of claim 4 wherein said side wall is circular in shape.

6. The laser device of claim 4 wherein said chamber is cylindrical in shape with a diameter slightly larger than the diameter of said ball.

7. The laser device of claim 6 wherein said body member has a threaded opening in said side wall that communicates with said chamber through which said ball is introduced into said chamber, and said opening is closed by a vented plug that is threaded therein.

8. The laser device of claim 4 wherein said means to mount is a flange on said rear wall of said body member.

9. The laser device of claim 4 having a third bore that extends through said side wall and intersects said first bore between said chamber and said rear wall.

10. A laser device for use in submarine service comprising:
 a laser unit for emitting a coherent light beam,
 a waterproof tubular housing enclosing said laser unit,
 a window in one end of said housing through which said coherent light beam can exit said housing,
 electrical conduit means for supplying power from an outside source to said laser unit, and
 a normally open electric switch controlling flow of said power through said conduit, said switch being operable by water pressure to close when immersed to at least a predetermined depth in water and thereby permit flow of power from said outside source through said conduit means to said laser unit.

* * * * *